United States Patent [19]

Severinsky

[11] Patent Number: 5,434,769
[45] Date of Patent: Jul. 18, 1995

[54] MULTI-PHASE ADAPTABLE AC-DC CONVERTER

[75] Inventor: Alex J. Severinsky, Silver Spring, Md.

[73] Assignee: Premier Power, Inc., McLean, Va.

[21] Appl. No.: 141,568

[22] Filed: Oct. 27, 1993

[51] Int. Cl.⁶ ............................................. H02M 3/18
[52] U.S. Cl. ...................................................... 363/61
[58] Field of Search ......................... 363/35, 53, 61, 76, 363/78, 87, 98, 101; 307/64, 66

[56] References Cited

U.S. PATENT DOCUMENTS

| | | | |
|---|---|---|---|
| 4,540,893 | 9/1985 | Bloomer | 307/248 |
| 4,940,929 | 7/1990 | Williams | 323/222 |
| 4,964,092 | 10/1990 | Severinsky et al. | 363/80 |
| 4,974,141 | 11/1990 | Severinsky et al. | 363/81 |
| 4,980,812 | 12/1990 | Johnson, Jr. et al. | 363/44 |
| 5,019,952 | 5/1991 | Smolenski et al. | 363/16 |
| 5,253,157 | 10/1993 | Severinsky | 363/98 |

Primary Examiner—R. Skudy
Assistant Examiner—E. To
Attorney, Agent, or Firm—Banner & Allegretti, Ltd.

[57] ABSTRACT

A phase adaptable AC/DC converter having three input terminals capable of connection to either a single phase or dual phase electrical power service. A feedback circuit in a control portion of the converter sums a first voltage and a second voltage which are proportional to first and second output voltages, respectively, to control a first bidirectional switch in a voltage boost circuit. The feedback circuit also sums the first and second voltage with a difference between the first and second output voltages to control a second bidirectional switch in the voltage boost circuit.

10 Claims, 2 Drawing Sheets

MULTI-PHASE ADAPTABLE AC-DC CONVERTER

BACKGROUND OF THE INVENTION

1. Technical Field

The present invention relates to the field of electronic power conversion and, more particularly, to multiphase medium-to-large power DC power supplies having electronic power factor correction for each phase.

2. Discussion of Relevant Art

In medium power level applications, mainly in 1–10 kW range, two phase 208/120 V electrical service is frequently used along with single phase 208 V or 240 V services. There are no conventional converters which will operate from either two phase or single phase service while providing unity power factor loading on the available phases.

There are numerous single phase AC-DC converters with electronic power factor correction. For example, U.S. Pat. No. 5,019,952 to Smolensky et al. discloses a conventional converter having power factor correction. The converter includes a rectifier bridge for rectifying a bipolar AC voltage waveform into a unipolar voltage which is fed to an electronically controlled DC-DC boost converter. The electronic controller pulsewidth modulates a switching semiconductor of a boost converter circuit so that current drawn from a power line via the rectifier bridge is proportional to the power line voltage waveform thus assuring a power factor close to unity.

One disadvantage of this circuit is that current flows through three diodes to the load, i.e., two diodes in the rectifier bridge and one in the boost converter, causing excessive power losses. Another disadvantage of the Smolensky et al. converter is that the modulation of the switching semiconductor causes large high frequency voltage changes on the negative terminal of the rectifier bridge, producing a substantial electromagnetic interference current in the power line conductors. Accordingly, costly filters are required between the rectifier bridge and the power line for the converter to comply with electromagnetic interference regulations. Yet another disadvantage of the Smolensky et al. converter is that the voltage applied to the switching semiconductors is large, equalling or exceeding of the maximum peak voltage of the AC waveform. Consequently, costs associated with switching semiconductors are high, particularly for MOSFETs which are commonly used in converter circuits. MOSFET costs increase approximately as a square of the drain-source voltage rating of a MOSFET increases.

U.S. Pat. No. 4,940,929 to Williams discloses a converter having an input filter for reducing the electromagnetic interference described above. Nevertheless, the Williams converter still has the disadvantages of the Smolensky et al. converter, i.e., excessive power losses and excessive filter and semiconductor costs.

U.S. Pat. No. 4,980,812 to Johnson, Jr. et al. discloses a circuit configuration having a boost converter between the power line and a rectifier bridge. The disclosed converter overcomes the disadvantagee of excessive power losses in rectifier diodes and excessive costs of input filters, but does not solve the disadvantage of high semiconductor costs.

SUMMARY OF THE INVENTION

With this background of the invention in mind, it is therefore a primary objective of this invention to overcome problems of prior art of single phase AC-DC converters having electronic power factor correction, while also providing a converter which automatically adapts to any electrical service, two phase or single phase.

According to the present invention, a phase adaptable AC-to-DC converter includes an input circuit capable of connection to either a single phase or dual phase electrical power service, a voltage boost circuit coupled to the input circuit for boosting a voltage received by the input circuit, a rectifier bridge circuit which rectifies the boosted voltage and a Control circuit coupled to the voltage boost circuit for producing a regulated output voltage at an output of the rectifier bridge circuit.

An input circuit, according to the present invention, includes three input terminals. When single phase power is available, a first input terminal of the input circuit is connected to the line voltage of the phase and a second input terminal is connected to the phase neutral. When dual phase electrical service is available, the line voltage of one phase is connected to the first input terminal, the line voltage of the other phase is connected to the second input terminal, and the neutral of both phases is connected to the third input terminal.

The present invention includes a feedback circuit in the control circuit which sums a first voltage proportional to a first output voltage and a second voltage proportional to a second output voltage to control a first bidirectional switch in the voltage boost circuit. Additionally, the first and second proportional voltages are summed with a difference between the first and second voltages to control a second bidirectional switch in the voltage boost circuit.

One embodiment of the present invention includes a sensor device for detecting current flowing in conductors in the input circuit which are connected to the electrical power service. Sensors coupled to input voltages of the electrical power service produce signals which are used by the control circuit to regulate an output voltage.

DETAILED DESCRIPTION

In general, the present invention includes two identical boost AC-DC converters, each with a topology of a single phase doubler rectifier. Both converters operate independently when two phases are connected to the input of the present invention. When only one phase is connected to the input, two control circuits, one for each converter, operate to provide equal output voltages on output capacitors, thereby allowing each boost converters to equally share power conversion.

Figure 1:
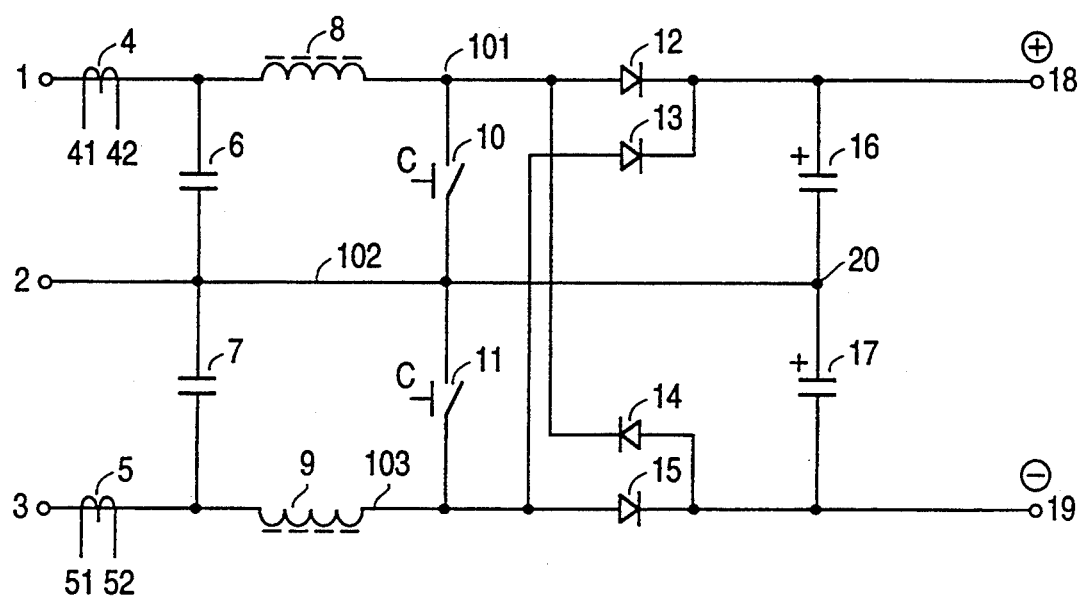
FIG. 1 is a schematic diagram of a power circuit for a phase adaptable AC-DC converter according to the present invention.

The power circuit in FIG. 1 is a combination of two boost AC-DC converters. The first converter includes choke 8, switch 10, diodes 12 and 14, and capacitors 16 and 17. The second converter includes choke 9, switch 11, diodes 13 and 15, and capacitors 16 and 17. The first converter is fed from terminals 1 and 2, while the second converter is fed from terminals 3 and 2. Both converters are controlled so that the output voltage on either capacitor 16 or 17 is larger than the peak AC voltage on input terminals 1 and 2, or input terminals 3 and 2, hence, the designation as a boost converter.

For single phase service, input terminals 1 and 3 are connected, for example, to the line voltage and neutral, respectively, of the single phase service. For dual phase service, input terminal 2 is connected to the neutral while input terminals 1 and 3 are connected to the line voltages of the respective phases.

Two filter capacitors 6 and 7 are connected across input terminals 1-2 and 3-2, respectively. Choke 8 is connected between phase input terminal 1 and conductor 101. Choke 9 is connected between input terminal 3 and conductor 103. Filter capacitors 6 and 7 shunt all current fluctuations at the switching frequency occurring through chokes 8 and 9 caused by periodically charging and discharging chokes 8 and 9.

Current transformer 4, having secondary winding terminals 41 and 42, is coupled to a conductor connecting choke 8 with input terminal 1. Similarly, current transformer 5, having secondary winding terminals 51 and 52, is coupled to a conductor connecting choke 9 with terminal 3. Other well-known current measuring devices can be used without changing the functionality of the present invention.

Bidirectional power semiconductor switch 10 is connected between conductor 101 and conductor 102. Similarly, bidirectional power semiconductor switch 11 is connected between conductor 103 and conductor 102. The term "bidirectional" means that an electric current flows in either direction between the terminals of the switch. There are number of known circuits which are useful as bidirectional power semiconductor switches.

Figure 2:
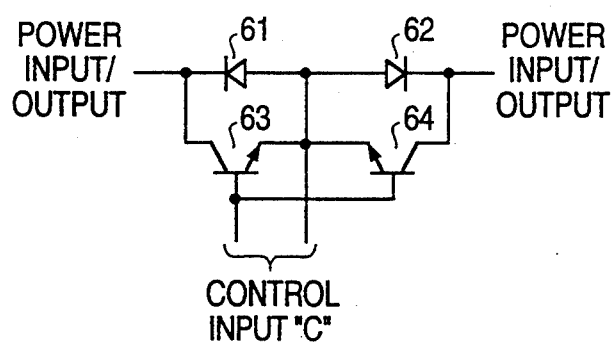
FIG. 2 is a schematic diagram of a bidirectional semiconductor switch according to the present invention.

FIG. 2 shows one embodiment of a bidirectional power semiconductor switch, according to the present invention. It includes two bipolar power transistors 63 and 64 having a common emitter connection. The collector terminal of each transistor is used a switch power terminal. The base terminals of both transistors are connected together and a control input voltage is applied between this common base terminal and the commonly-connected emitters. Diodes 61 and 62 are connected in parallel with transistors 63 and 64, respectively, so that the anode terminal of each diode is connected to the commonly-connected emitters.

When current is applied to the base of both transistors of a bidirectional semiconductor switch, both transistors conduct and current flows from one collector to the other in either direction depending on the polarity of the voltage appearing across the collectors. In one direction, current flows through transistor 63 and diode 62. In the other direction, current flows through transistor 64 and diode 61.

A fullwave rectifier bridge is connected between conductors 101 and 103 on the input AC side of the converter and output terminals 18 and 19 on the output side. The anode of diode 12 is connected to conductor 101 and the cathode to terminal 18. The anode of diode 13 is connected to conductor 103 and the cathode to terminal 18. The cathode of diode of 14 is connected to conductor 101 and the anode to terminal 19. The cathode of diode 15 is connected to conductor 103 and the anode to terminal 19.

Capacitors 16 and 17 are connected in series between output terminals 18 and 19 and act as electrical charge storage devices. Terminal 18 is designated as a positive DC output voltage terminal, while terminal 19 is designated as a negative DC output voltage terminal. When capacitors 16 and 17 are embodied as electrolytic capacitors, the positive terminal of capacitor 16 is connected to terminal 18 and the negative terminal of capacitor 16 is connected common point 20. The negative terminal of capacitor 17 is connected to terminal 19 and the positive terminal of capacitor 17 is connected to common point 20. Common point 20 is connected to conductor 102 and, via conductor 102, to input terminal 2.

Figure 3:
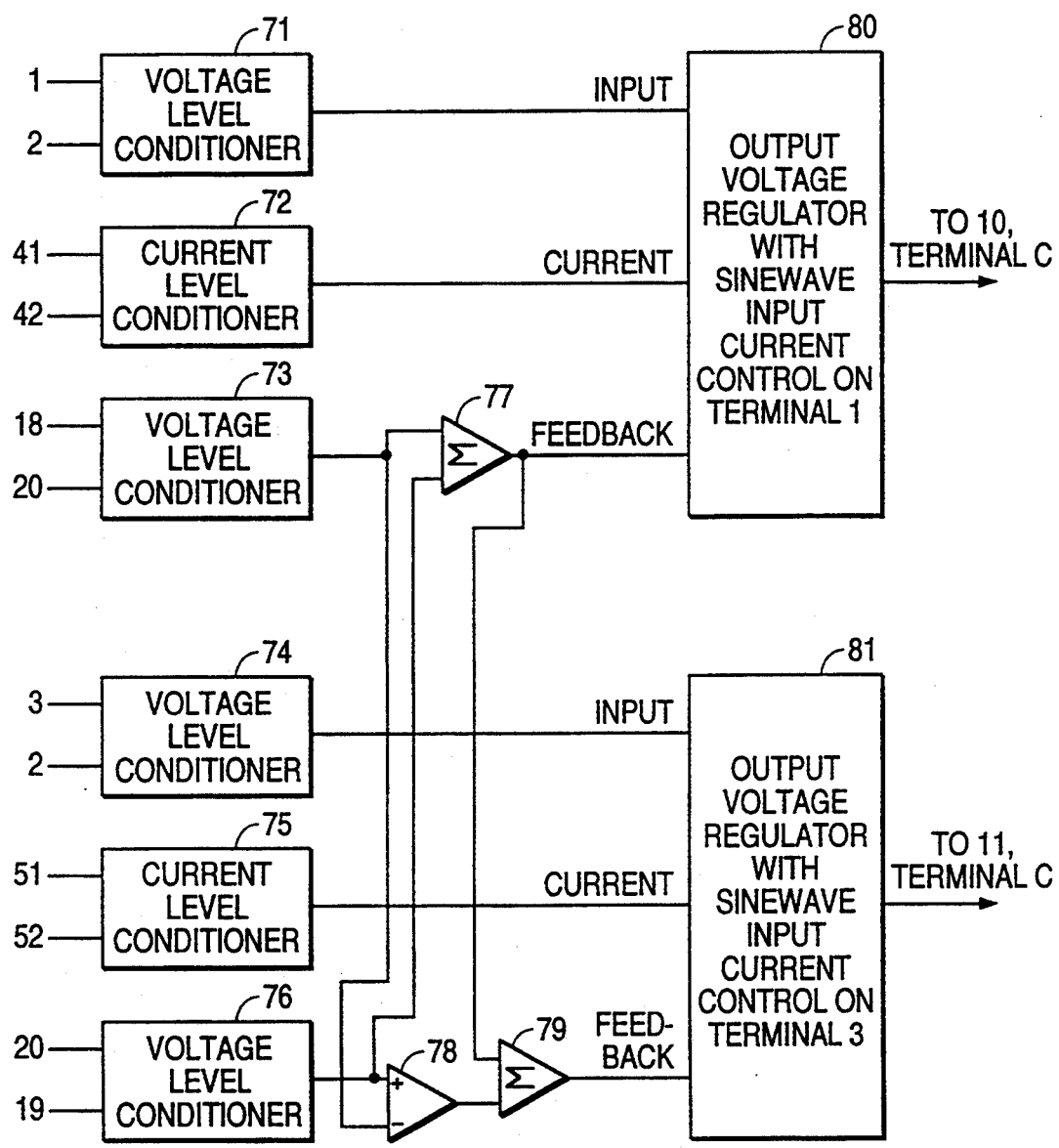
FIG. 3 is a block diagram of logic circuits for a phase adaptable AC-DC converter according to the present invention.

Voltage regulator circuits 80 and 81, shown in FIG. 3, control bidirectional switches 10 and 11, respectively. Regulator circuit 80 is connected to control terminal "C" of switch 10. Similarly, regulator circuit 81 is connected to control terminal "C" of switch 11. The regulator circuits output a signal which controls the ON and OFF state of the bidirectional switches.

Voltage regulators 81 and 82 operate to force the boost converters to produce regulated voltages of equal value on capacitors 16 and 17, while drawing a sinewave current from the input power conductors connected to input terminals 1-3. Voltage regulators 81 and 82 are current-mode control type regulators having input power factor correction. There are numerous such regulators available. Examples are described in U.S. Pat. Nos. 4,974,141, 4,964,029, and 4,540,893. These regulators output a pulsewidth modulated (PWM) signal to the bidirectional power semiconductor switches; i.e., a series of pulses usually at fixed frequency, but with variable duty cycle. The periodicity, or the switching frequency, of the bidirectional power semiconductor switching is typically 100–1000 times greater than the frequency of power service.

The duty cycle, or the pulse width, is controlled so that input current sensed by current transformers 4 and 5 becomes equal to a reference waveform. The reference waveform is made to be a sinewave either by use of a reference sinewave generator or by use of the input voltage as the waveform source. If a reference sinewave generator is used, then it is synchronized and phase-locked to the input AC voltage. The amplitude of this reference waveform is controlled by the feedback signal from the output.

Typically, three signals are required to operate the voltage regulators. The input voltage signal is used as a sine waveform reference, or as a phase and frequency reference. The input current signal is used to compare to the desired reference current signal to control duty cycle of the bidirectional semiconductor switches. The feedback signal is used to change the amplitude of internal current reference waveform.

FIG. 3 shows that each regulator circuit has three inputs. The first, labelled "INPUT", is coupled to input terminals 1 and 2 of the first converter, or to input terminals 2 and 3 of the second converter. The second, labelled "FEEDBACK," is coupled to output terminals 18 and 20 of the first converter, or to output terminals 19 and 20 of the second converter. The third input, labelled "CURRENT", is coupled to current transformer secondary terminals 41 and 42, or secondary terminals 51 and 52.

Four voltage level conditioners, 71, 73, 74, and 76, function to reduce the respective input voltage levels to voltage levels which are compatible with commonly-available integrated circuits. Voltage level conditioners 71 and 74 provide the "INPUT" voltage signals to regulators 80 and 81. The voltages on the output of the converters are measured by voltage conditioners 73 and 76. There are numerous well-known voltage level conditioner circuits, the simplest being a resistive voltage divider.

Conditioner 71 is connected to input terminals 1 and 2 of the first converter. The output of conditioner 71 is connected to the "INPUT" terminal of regulator 80. Conditioner 74 is connected to input terminals 3 and 2, while the output of conditioner 74 is connected to the "INPUT" terminal regulator 81. Conditioner 73 is connected to output terminal 18 and common point 20. Conditioner 76 is connected to output terminal 19 and common point 20. The outputs of conditioners 73 and 76 are connected to summing amplifier 77. The sum of those voltages is proportional to voltage on both capacitors 16 and 17, or to the combined output voltage. This proportional voltage is generated on the output of summing amplifier 77 and coupled to the "FEEDBACK" input of both regulators 80 and 81. While this voltage is coupled directly to regulator 80, it is coupled through summing amplifier 79 having unity gain to regulator 81. The output of amplifier 77 is connected to the "FEEDBACK" input regulator 80.

The outputs of conditioners 73 and 76 are also connected to difference amplifier 78. The outputs of amplifiers 77 and 78 are connected to summing amplifier 79. Differential amplifier 78 outputs a voltage proportional to the difference of the absolute voltage values on capacitors 16 and 17. The output of differential amplifier 78 is coupled to the input of the summing amplifier 79. The output of amplifier 79 is connected to the "FEEDBACK" input of regulator 81.

Current level conditioners 72 and 73 function to provide a voltage which is proportional to the current sensed by the current transformers while having an amplitude compatible with commonly-available integrated circuits. Conditioner 72 is connected to terminals 41 and 42 of transformer 4, while the output of conditioner 72 is connected to the "CURRENT" input of regulator 80. Conditioner 75 is connected to terminals 51 and 52 of transformer 5. The output of conditioner 75 is connected to the "CURRENT" input of regulator 81.

In steady state operation, when the voltage on terminal 1 is greater than the voltage on terminal 2, i.e., positive input polarity, current flows through choke 8 and diode 12 to charge capacitor 16. When the voltage on capacitor 16 is greater than the voltage on either input terminals 1 and 2, the current flowing through choke 8 decreases. When switch 10 is turned on by regulator 80, terminal 1 is connected to terminal 2 via choke 8 and the current flowing through choke 8 increases. When switch 10 is turned off, the current flowing in choke 8 is diverted via diode 12 to charge capacitor 16.

Similar operation occurs when the voltage on terminal 1 is less than the voltage on terminal 2, i.e., negative input polarity. In this situation, diode 14 conducts and charges capacitor 17. Thus, during positive polarity of the input voltage, capacitor 16 is charged, and during negative polarity of the input voltage, capacitor 17 is charged. The combined output voltage on both capacitors is twice the voltage on either capacitor, hence, the designation of a doubler rectifier topology. The combined output voltage appears across output terminals 18 and 19. By controlling the duty cycle of switch 10, it is possible to regulate the voltage on capacitors 16 and 17 when the voltage on terminals 1 and 2 varies between positive and negative input polarity.

The second boost converter operates in a similar manner. In steady state operation, when voltage on terminal 3 is greater than the voltage on terminal 2, current flows through choke 9 and diode 13 to charge capacitor 16. When the voltage on capacitor 16 is greater than the voltage on either input terminals 3 and 2, the current flowing through choke 9 decreases. When switch 11 is turned on by regulator 81, terminal 3 is connected to terminal 2 via choke 9 and the current flowing through choke 9 increases. When switch 11 is turned off, the current flowing in choke 9 is diverted via the diode 13 to charge capacitor 16.

Similar operation occurs when the voltage on terminal 3 is less than on terminal 2. In this situation, diode 15 conducts and charges capacitor 17. Thus, during positive polarity of the input voltage, capacitor 16 is charged, and during the negative polarity of the input voltage capacitor 17 is charged.

As can be seen, both converters charge capacitors 16 and 17 simultaneously in parallel. Moreover, by controlling the duty cycle of switch 11, it is possible to regulate the current through choke 9 so it will be the same as the current through choke 8.

When the input electrical service is two phase, conductor 102 serves as a return path for currents in each phase and both boost converters operate independently while providing the same value of regulated output voltage. In this situation, the output of differential amplifier 78 is zero and the feedback voltages on the input of either regulator 80 or 81 are the same. Thus, each regulator regulates its own current.

When the input electrical service is single phase, conductor 102 is not used as current return path for the converters and, therefore, floats with the output voltages on terminals 18 and 19. If the voltage rating for power semiconductor switches 10 and 11 and capacitors 16 and 17 are satisfactory for two phase operation when output voltage is divided equally on capacitors, then when conductor 102 floats in single phase operation, those ratings will be twice the rating necessary for single phase operation.

The circuit of amplifiers 78 and 79 eliminates this problem. They act as a feedback circuit for a voltage difference on both output capacitors, making the output voltages equal and thereby making the current in the input conductor connected to input terminal 3 equal to current in the input conductor connected to terminal 1.

Thus, the voltage rating on each bidirectional semiconductor switch and capacitors 16 and 17 need only be half of the rating for a conventional single phase converter. When MOSFETs are used as bidirectional semiconductor switches 10 and 11, significant cost savings can be achieved since devices having a voltage rating which is one half the voltage of the single phase service are required.

Thus, the present invention operates with either single or dual phase electric service, as well as with unequal loading, or DC leakage in output capacitors when working from a single phase service.

I claim:

1. A phase adaptable AC-to-DC power converter comprising:
   input means for receiving an input voltage and a current;
   a first boost converter having a pair of input terminals and a pair of output terminals, at least one of said pair of input terminals being coupled to said input means;

a second boost converter having a pair of input terminals and a pair of output terminals, at least one of said pair of input terminals being coupled to said input means;

a rectifier/doubler having a pair of input terminals and a pair of output terminals, one of said pair of input terminals being coupled to a respective one of said pair of output terminals of said first boost converter and the second of said pair of input terminals being coupled to a respective one of said pair of output terminals of said second boost converter;

an output filter formed of at least two capacitive elements serially connected at a common node, the other end of said capacitive elements being connected to respective ones of said pair of output terminals of said rectifier/doubler, one of said pair of input terminals of said first and second boost converters and one of said pair of output terminals of said first and second boost converters and said rectifier/doubler being connected to said common node;

control means coupled to said first and second boost converters for controlling the operation of said first and second boost converters to provide a regulated voltage; and output means coupled to said output filter for delivering said regulated voltage to a load.

2. The phase adaptable AC-to-DC power converter according to claim 1, wherein said control includes current level sensing means for sensing the level of current received by the input means, said level of current being used by said control means to control the operation of said first and second boost converter.

3. The phase adaptable AC-to-DC power converter according to claim 1, wherein said first and second boost converters include bidirectional semiconductor power switches; the operation of said switches being controlled by said control means to provide said regulated voltage.

4. An AC-to-DC power converter comprising:
an input circuit having a first input terminal, a second input terminal and a third input terminal;
a first inductor having a first lead and a second lead, the first lead being coupled to the first input terminal;
a second inductor having a first lead and a second lead, the first lead being coupled to the second input terminal;
a first switching device coupled between the second lead of the first inductor and the third input terminal, and having a control input terminal;
a second switching device coupled between the second lead of the second inductor and the third input terminal, and having a control input terminal;
a bridge rectifier having first and second input terminals, and first and second output terminals, the first input terminal coupled to the second lead of the first inductor, and the second input terminal coupled to the second lead of the second inductor;
a first capacitor coupled between the first output terminal of the bridge rectifier and the third terminal;
a second capacitor coupled between the second output terminal of the bridge rectifier and the third terminal; and
a feedback circuit coupled to the first and second output terminals of the bridge rectifier and to the control input terminals of the first and second switching devices, the feedback circuit controlling the first and second switching devices to produce a regulated voltage at the first and second output terminals of the bridge rectifier.

5. The AC-to-DC power converter according to claim 4 wherein a single phase power service can be connected so that a line voltage of the service is connected to the first input terminal and a neutral of the service is connected to the second input terminal, and a dual phase power service can be connected so that a line voltage of one phase of the service is connected to the first input terminal, a line voltage of the other phase of the service is connected to the second terminal and the neutral of both phases of the service is connected to the third input terminal.

6. The AC-to-DC power converter according to claim 4 wherein the feedback circuit sums a first voltage proportional to a voltage on the first capacitor and a second voltage proportional to a voltage on the second capacitor to control the first switching device.

7. The AC-to-DC power converter according to claim 4 wherein the feedback circuit sums the first voltage and the second voltage with the difference between the first and second voltages to control the second switching device.

8. A phase adaptable AC-to-DC power converter comprising:
input means for receiving an input voltage and a current;
a first boost converter having a pair of input terminals and a pair of output terminals, at least one of said pair of input terminals being coupled to said input means;
a second boost converter having a pair of input terminals and a pair of output terminals, at least one of said pair of input terminals being coupled to said input means;
a rectifier/doubler having a pair of input terminals and a pair of output terminals, one of said pair of input terminals being coupled to a respective one of said pair of output terminals of said first boost converter and the second of said pair of input terminals being coupled to a respective one of said pair of output terminals of said second boost converter;
an output filter formed of at least two capacitive elements serially connected at a common node, the other end of each of said capacitive elements being connected to respective ones of said pair of output terminals of said rectifier/doubler, one of said pair of input terminals of said first and second boost converters and one of said pair of output terminals of said first and second boost converters and said rectifier/doubler being connected to said common node;
control means coupled to said first and second boost converters for controlling the operation of said first and second boost converters to provide a regulated voltage, said control means including a feedback circuit coupled to the outputs of said first and second boost converters to provide a control signal for said control means; and
output means coupled to said output filter for delivering said regulated voltage to a load.

9. The AC-to-DC power converter according to claim 8 wherein said feedback circuit sums a first voltage proportional to a voltage at the output of first boost converter and a second voltage proportional to a voltage at the output of said second converter to provide said control signal for controlling the operation of said first boost converter.

10. The AC-to-DC power converter according to claim 9 wherein said feedback circuit sums the first voltage and the second voltage with the difference between the first and second voltages to provide said control signal for controlling the operation of said second boost converter.

* * * * *